United States Patent [19]
Kobayashi et al.

[11] Patent Number: 5,113,265
[45] Date of Patent: May 12, 1992

[54] APPARATUS FOR DETERMINING RECORDING MODE OF FREQUENCY-MODULATED VIDEO SIGNAL

[75] Inventors: Yasuhito Kobayashi; Junichi Matsuo, both of Tokyo, Japan

[73] Assignee: Fuji Photo Film Co., Ltd., Kanagawa, Japan

[21] Appl. No.: 407,309

[22] Filed: Sep. 14, 1989

[30] Foreign Application Priority Data

Sep. 28, 1988 [JP] Japan .................................. 63-240861
Feb. 3, 1989 [JP] Japan ...................................... 1-24033

[51] Int. Cl.$^5$ ............................................. H04N 5/78
[52] U.S. Cl. ..................... 358/330; 358/335; 358/310; 360/33.1
[58] Field of Search ............... 358/310, 330, 319, 335, 358/909, 906; 360/28, 29, 30, 25, 9, 33.1

[56] References Cited

U.S. PATENT DOCUMENTS

| | | | |
|---|---|---|---|
| 4,642,704 | 2/1987 | Douotsubo | 360/27 |
| 4,686,585 | 8/1987 | Sato | 358/370 |
| 4,772,950 | 9/1988 | Furuhata et al. | 358/320 |
| 4,949,195 | 8/1990 | Fujiwara | 360/33.1 |

Primary Examiner—Roy N. Envall, Jr.
Assistant Examiner—Huy Nguyen

[57] ABSTRACT

An apparatus determines a recording mode of a frequency-modulated video signal read out from a recording medium. The apparatus extracts, from demodulated video signals, pulse signals related to vertical and horizontal synchronization signals. With consideration of a period defined by these pulse signals, the apparatus sets a predetermined period, in which, a signal containing a sync tip frequency component of the frequency-modulated signal is counted to determine the recording mode depending on a resultant count.

12 Claims, 7 Drawing Sheets

NORMAL BAND

HIGH BAND

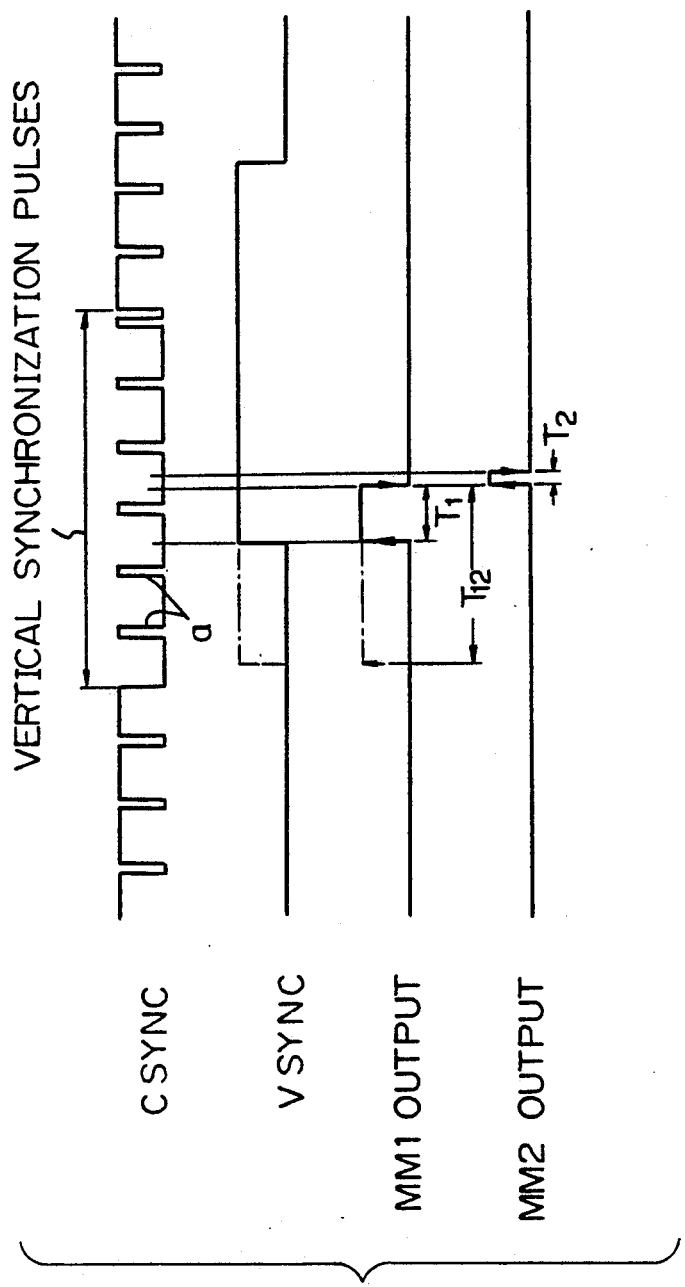

APPARATUS FOR DETERMINING RECORDING MODE OF FREQUENCY-MODULATED VIDEO SIGNAL

BACKGROUND OF THE INVENTION

1. Field of the Invention

The present invention relates to an apparatus for determining a recording mode of a frequency-modulated video signal, and in particular, to an apparatus for sensing a video signal which is recorded on a recording medium in a recording mode under frequency modulation which is possibly of different frequencies from mode to mode and for determining in which recording mode the video signal is recorded. The present invention relates to an apparatus for discriminating between a normal-band recording mode and a high-band recording mode of a still video signal recorded on a recording medium, for example.

2. Description of the Related Art

Modes of recording a still picture signal produced by an electronic still camera, for example, on a high-density magnetic floppy disk include a normal-band recording mode and a high-band recording mode.

The still picture signal includes a luminance signal Y and a chroma signal C. The chroma signal C generally includes color difference signals R−Y and B−Y. According to the normal-band recording mode, the luminance signal Y is adopted to achieve a frequency modulation on a carrier having a center frequency of 7 MHz. The frequency-modulated wave is represented as an Y−RF signal. The color difference signals R−Y and B−Y are respectively used for a frequency modulation of carriers of 1.2 MHz and 1.3 MHz, respectively. The resultant frequency-modulated wave is expressed as an C−RF signal. The signals Y−RF and C−RF are mixed with each other to be recorded on a track of a floppy disk for achieving a still picture recording.

FIG. 5A shows frequency allocations of signals Y−RF and C−RF. The signal Y−RF has a sync tip frequency of 6 MHz, a white peak frequency of 7.5 MHz, and a frequency deviation of 1.5 MHz.

In contrast, in a case where the high-band recording mode is utilized to record a high-resolution still video signal, a carrier adopted to achieve a frequency modulation on the luminance signal Y is set to 9 MHz. As shown in FIG. 5B, the signal Y−RF has a sync tip frequency of 7.7 MHz, a white peak frequency of 9.7 MHz, and a frequency deviation of 2 MHz. The signal C−RF is the same as that of the normal-band recording mode.

The playback systems, particularly, of the FM demodulation circuit also depend exclusively upon the variety of the still video signal recording modes. In consequence, an apparatus capable of reproducing both of the normal-band and high-band signals is provided with normal-band and high-band FM demodulation circuits. Because a floppy disk to be loaded in a playback apparatus does not include an explicit indication of the low-band or high-band recording mode employed for the still picture signal recording, even track by track, when the playback apparatus reads out a video signal from the floppy disk, the apparatus is required to determine the recording mode of the obtained video signal, for selecting an appropriate one of the demodulator circuits. Namely, for the selection between the demodulation circuits, a recording mode of the RF video signal is required to be automatically determined.

As noted above, because the carrier frequency of the frequency modulation is different between the normal and high bands, the RF video signals are demodulated so that a difference appears in the voltage of the demodulated signals between both bands. Determination of the recording mode is possibly achieved by use of the voltage difference. However, this decision procedure is attended with problems that adjustment of a threshold voltage is necessary for the judgement. Moreover, a long period of time is required to attain a relatively stable voltage through the demodulation which extends the judgement or determination processing.

SUMMARY OF THE INVENTION

It is therefore an object of the present invention to provide a recording mode determining apparatus capable of appropriately determining at a relatively high speed a recording mode of a frequency-modulated video signal, which removes the disadvantages in the conventional apparatus.

In accordance with the present invention, an apparatus for determining a recording mode of a frequency-modulated video signal which is recorded on a recording medium in a recording mode under frequency modulation that may be different in frequency from mode to mode includes reader means for reading out a frequency modulated video signal from the recording medium, demodulator means for demodulating the frequency modulated video signal read out from the recording medium, synchronization signal separator means for extracting pulse signals related to a vertical synchronization signal and a horizontal sychronization signal from the video signal demodulated by said demodulator means, period setting means for setting a predetermined period on the basis of a period in which the pulse signals are generated, counter means for counting during the predetermined period set by said period setting means a signal containing a sync tip frequency component of the frequency-modulated video signal read out by said reader means, and judge means for determining the recording mode based on a resultant count in said counter means.

BRIEF DESCRIPTION OF THE DRAWINGS

The objects and features of the present invention will become more apparent from the consideration of the following detailed description taken in conjunction with the accompanying drawings in which:

FIG. 8 is a timing chart useful for understanding the operation of the apparatus of FIG. 7.

DESCRIPTION OF THE PREFERRED EMBODIMENTS

Figure 1:
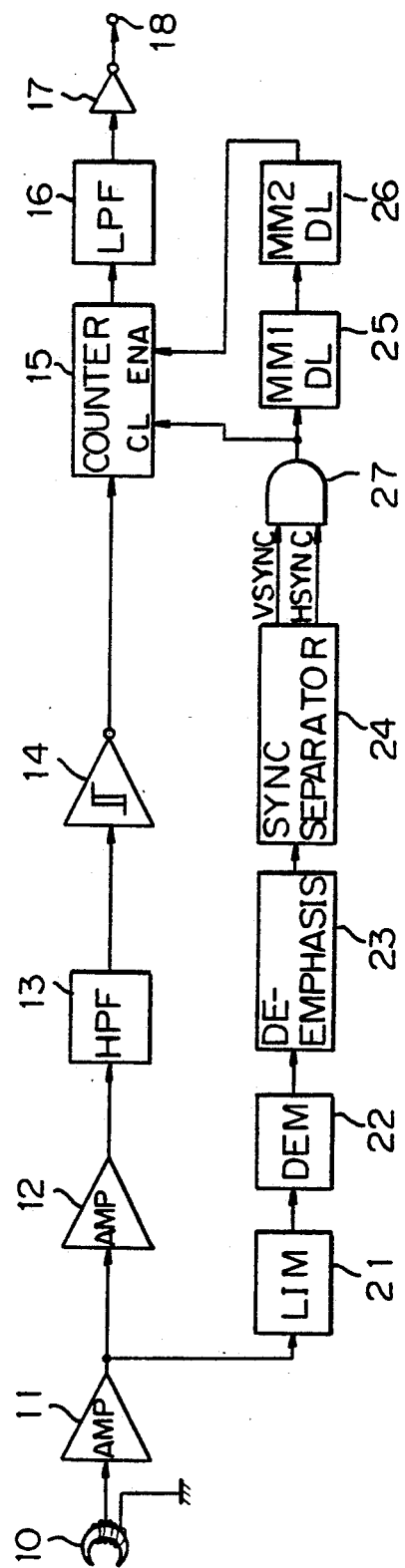
FIG. 1 is a schematic block diagram showing an embodiment of a recording mode determining apparatus in accordance with the present invention.

Referring now to the drawings, a description will be given in detail of an embodiment in which an apparatus for determining a frequency-modulated video signal recording mode in accordance with the present invention is applied to an apparatus for discriminating the normal band recording mode from the high-band recording mode.

FIG. 1 shows an embodiment of a recording mode determining apparatus in accordance with the present invention. The block diagram of FIG. 1 shows a portion of the apparatus for reproducing a still video signal recorded on a floppy disk, in particular, a portion of a recording mode determining circuit.

A still video signal which is a frequency-modulated, RF signal and is recorded on a floppy disk, not shown, is read out therefrom by a magnetic head 10 to be fed to a head amplifier 11. The reproduced RF signal, thereafter amplified by the head amplifier 11, is delivered to an amplifier 12, which further amplifies the signal to be fed to a limiter 21. The limiter 21 limits an amplitude of the resultant signal. The reproduced RF signal amplified by the amplifier 12 is then transmitted to a high-pass filter 13.

The recording mode determining process is executed in a very short period of time T2 in which a vertical synchronization signal VSYNC appears and in which a horizontal synchronization signal does not exert any influence. In the period T2, the reproduced RF signal includes a sync tip frequency component of the signal Y−RF, a center frequency component of the signal C−RF, and a synchronization signal component. The high-pass filter 13 passes therethrough only the sync tip frequency component of the signal Y−RF. The high-pass filter 13 has a cutoff frequency set to about 1.5 MHz, for example.

Figure 3:
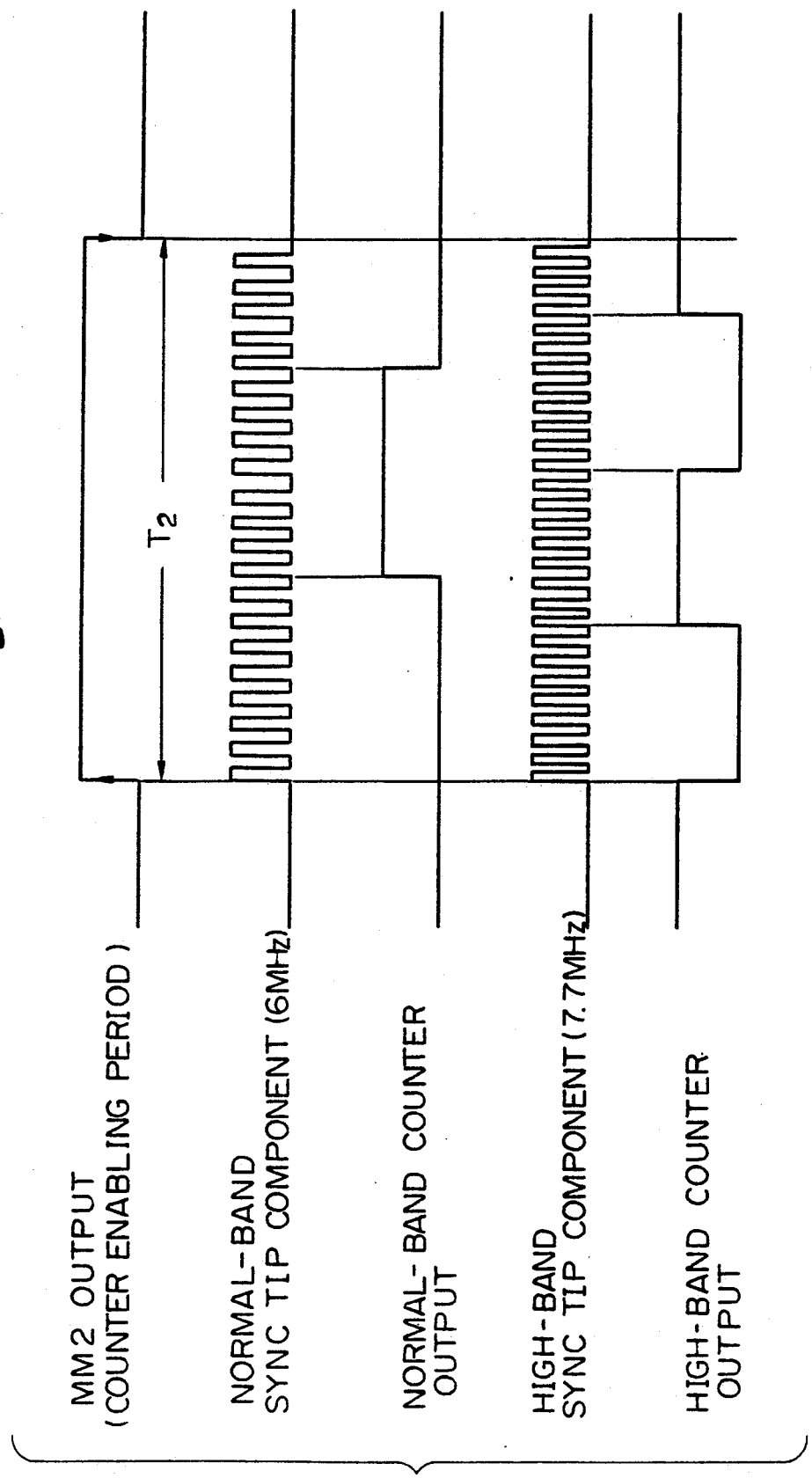
FIG. 3 is a timing chart showing a portion of FIG. 2 in which the scale of time is magnified.

The signal passing through the high-pass filter 13 is delivered to a Schmitt inverter 14, which discriminates a level of the signal based on a zero-level threshold value to shape the signal, for producing a pulse signal or a square-wave signal. The pulse signal is fed to a counter 15. The counter 15 operates only in the period T2 mentioned above to count received pulse signals. FIG. 3 shows input pulse signals including normal-band and high-band sync tip components supplied to the counter 15 and an output signal therefrom.

On the other hand, the RF signal sent to the limiter 21 is further delivered to an FM demodulation circuit 22 to be FM-demodulated. The resultant signal is fed via a de-emphasis circuit 23 to a synchronization signal separator circuit 24. The synchronization signal separator circuit 24 extracts the vertical synchronization signal VSYNC and the horizontal synchronization signal HSYNC from the received RF signal to deliver the obtained signals to an AND gate 27.

Incidentally, because the synchronization signals are contained in the luminance signal Y, the processing described above needs only to be achieved on the luminance signal Y. Consequently, more specifically, the RF signal supplied from the amplifier 11 is sent to an Y/C separator circuit, not shown, such that a signal Y−RF delivered from the separating circuit is fed via the limiter 21 to the demodulation circuit 22.

As described above, the playback apparatus for the normal and high bands includes a normal-band demodulator circuit and a high-band demodulator circuit, which are selectable depending on the result of determination of the normal or high band. The modulation circuit 22 shown in FIG. 1 includes the two types of modulator circuits and a switching circuit to effect the selection therebetween. Signals required for the operation of the recording mode determinating circuit include the vertical and horizontal sychronization signals VSYNC and HSYNC. Regardless of whether the reproduced RF signal belongs to the normal or high band, when the signal is demodulated by either one of the two kinds of demodulator circuits, the vertical and horizontal sychronization signals VSYNC and HSYNC are satisfactorily obtained. Actually, until the normal or high band is determined through the determination processing, the switching circuit needs only to be controlled to enable one of the normal-band and high-band demodulation circuits selected depending on the results from the previous determination to operate.

Figure 2:
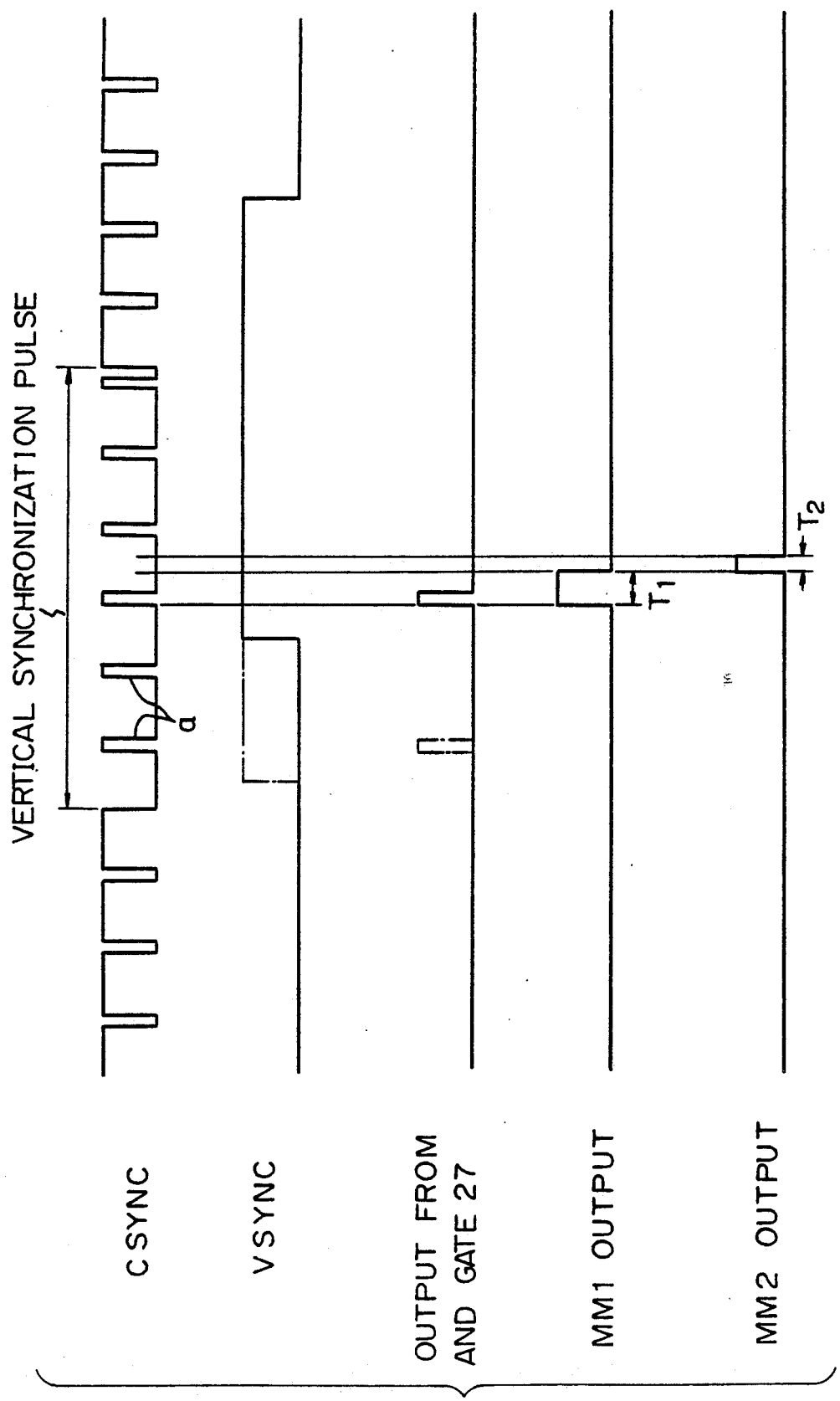
FIG. 2 is a timing chart useful for understanding the operation of the apparatus of FIG. 1.

FIG. 2 shows a complex synchronization signal CSYNC extracted from the demodulated video signal. The complex synchronization signal CSYNC has a portion of a vertical sychronization pulse which extends for a 3H period. In order to enable the horizontal synchronization signal to continue in this period, the period is subdivided by use of a 0.07H duration pulse a into six sections with an interval of 0.43H therebetween. The 0.07H duration pulse portion is referred to as a demarcation pulse portion.

Although various types of synchronization signal separator circuits 24 are available, the synchronization signal separator circuit 24 of this embodiment generates a vertical synchronization signal VSYNC delayed substantially by a 1H period from the vertical synchronization pulse portion of the complex synchronization signal CSYNC and a horizontal synchronization signal HSYNC a of the complex synchronization signal CSYNC. The vertical and horizontal synchronization signals VSYNC and HSYNC a are supplied to the AND gate 27. As shown in FIG. 2, the AND gate 27 outputs an AND signal of the received vertical and horizontal synchronization signals VSYNC and HSYNC a. When both synchronization signals are received, the AND gate 27 produces an output signal.

The output signal from the AND gate 27 is fed to a clear input CL of the counter 15 and to a first monostable multivibrator, MM1, 25. The counter 15 is reset by the output signal from the AND gate 27. The monostable multivibrator, MM1, 25 produces an output which is set to a high level at a timing of a positive-going edge of the output signal from the AND gate 27 so as to be kept in a level H for a predetermined period of time T1 (19.8 microseconds, μs, in this embodiment). The monostable multivibrator, MM1, 25 supplies an output to a second monostable multivibrator, MM2, 26.

The output from the second monostable multivibrator, MM2, 26 is set to a high level at the timing of the negative-going edge of the output signal from the first monostable multivibrator, MM1, 25. The second monostable multivibrator 26 thereafter produces a signal retaining a level H for a predetermined period of time T2 (3.49 μs in this embodiment). The output signal is sent to an enable terminal ENA of the counter 15. In consequence, the counter 15 operates for the period T2.

The period T2 in which the counter 15 operates is a vertical synchronization pulse portion of the complex synchronization signal CSYNC and is desirably a portion where the demarcation pulse a, namely, the horizontal synchronization signal HSYNC does not change. The signal of the sync tip frequency component supplied to the counter 15 may possibly be disturbed at an edge of the vertical synchronization pulse portion. The frequency of the signal may vary when the level of the demarcation pulse a is altered. In consequence, in order for the counter 15 to appropriately count the signal of the sync tip frequency component, the period of time T2 is required to be set for the signal counting operation in either one of the high-level and low-level portions of the demarcation pulse a.

The counter 15 is cleared by the output signal from the AND gate 27 to conduct the counting operation during a period of time when the output signal from the second monostable multivibrator 26 is at the level H. The frequency signal produced by the Schmitt inverter 14 at the timing of the sync tip is divided into one sixteenth in this embodiment. As noted above, since the sync tip frequency is different between the normal-band and high-band recording methods, even if an identical demultiplication factor is used, different frequencies are obtained as a result of the frequency division. In this embodiment, since the counting operation period T2 of the counter 15 is 3.49 μs, as shown in FIG. 3, for a 6 MHz input signal, when the period T2 is terminated, the output from the counter 15 is set to the level L. For a 7.7 MHz input signal, the output signal is set to and is retained at the level H. In consequence, depending on the output signal level of the counter 15 at a point of time when the period T2 is elapsed, the normal-band or high-band recording may be determined.

The counter 15 delivers its output signal to a low-pass filter 16, which produces an output to be sent via an inverter 17 to an output terminal 18.

Figure 4:
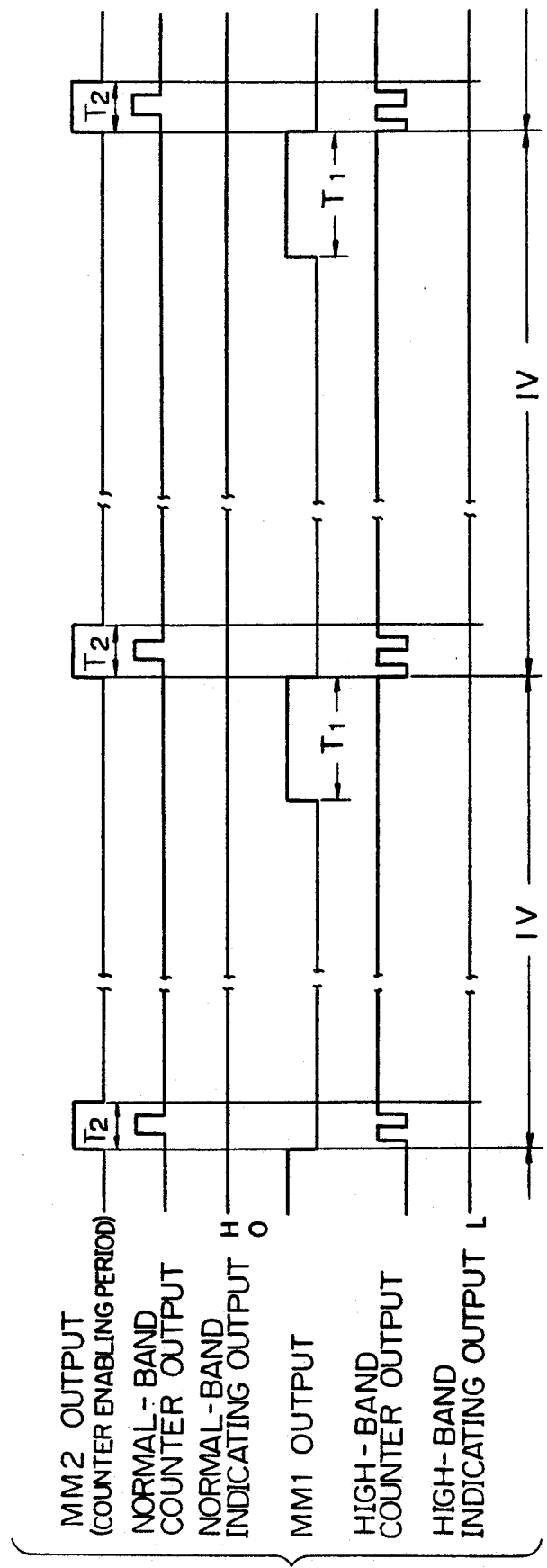
FIG. 4 is a timing chart showing the operation in a period of 1V or more in which the scale of time is compressed as compared with FIG. 2.
Figure 5A:
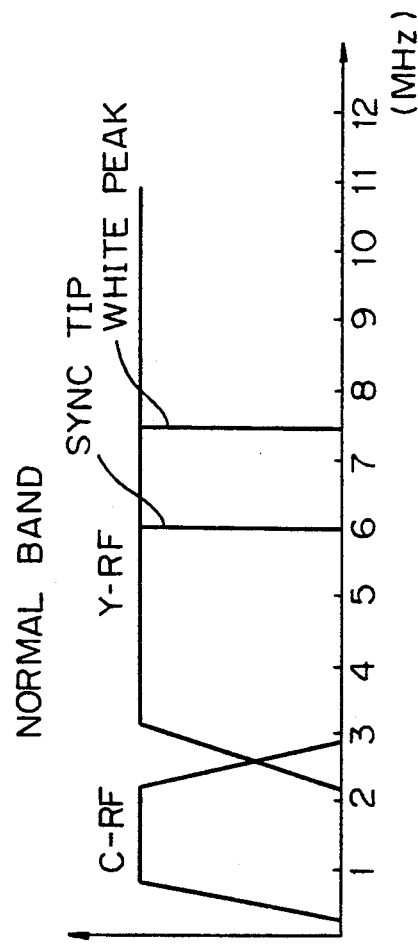
FIG. 5A is a graph showing a frequency allocation in the normal-band recording.
Figure 5B:
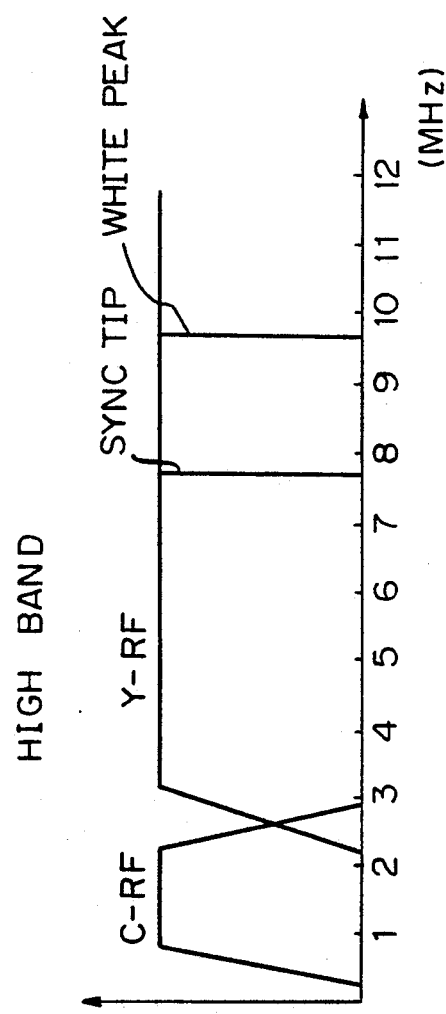
FIG. 5B is a graph showing a frequency allocation in the high-band recording.

Referring to the timing chart of FIG. 4, when an output signal from the output terminal 18 is at a level L or H, the high-band or normal-band recording mode is accordingly determined.

In this manner, when the recording mode of a still image signal recorded on a magnetic recording medium is determined to be the normal-band or high-band recording mode, the playback processing is accordingly achieved so that the selection is carried out between the demodulator circuits, for example.

In this embodiment, when the output from the AND gate 27 sets the vertical synchronization pulse VSYNC and the horizontal synchronization signal a to the high level, the output from the first monostable multivibrator, MM1, 25 is set to its high level to define the period T1. Since the period T1 is longer than the period of the horizontal synchronization signal a, after the period T1 is terminated, in time with a negative-going edge of the output signal from the first monostable multivibrator, MM1, 25, the output from the second monostable multivibrator, MM2, 26 is set to its high level to define the period T2. The period T2 is established between the horizontal synchronization signals a. In the period T2, the counter 15 counts the signal of the sync tip frequency component. In consequence, the counting operation may be achieved in a state free from a disturbance of the signal due to the level change in the horizontal synchronization signal a.

Incidentally, in order to conduct the measurement of the sync tip frequency in a signal with a little disturbance, the period T2 is advantageously set at a position which is substantially a center between the horizontal synchronization signals a.

Furthermore, as indicated by a dot-and-dash line in FIG. 2, when using a synchronization signal separator circuit for generating a vertical synchronization signal VSYNC which is set to a high level almost without delay with respect to a vertical synchronization pulse portion of the complex synchronization signal CSYNC, the output from the AND gate 27 matches with the first horizontal synchronization signal a in the vertical synchronization pulse portion of the complex synchronization signal CSYNC. In consequence, the outputs produced respectively from the first and second monostable multivibrators, MM1, 25 and, MM2, 26 are shifted, which causes the period T2 to be established between the first and second horizontal synchronization signals a.

Figure 6:
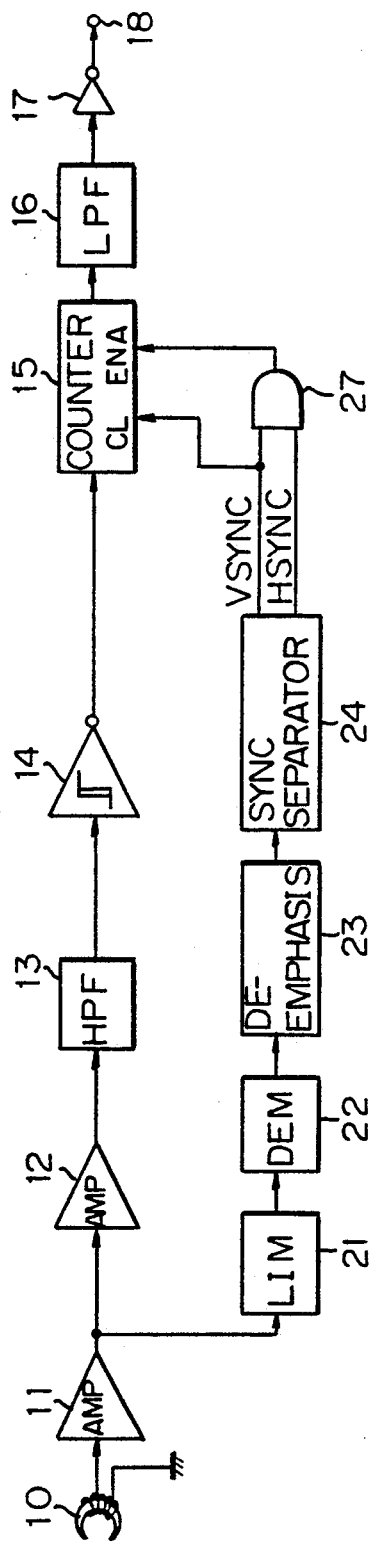
FIG. 6 is a schematic block diagram showing an alternative embodiment of a recording mode determining apparatus in accordance with the present invention.

FIG. 6 shows an alternative embodiment of the recording mode determining apparatus in accordance with the present invention.

In this embodiment, a synchronization signal separator circuit 24 outputs a vertical synchronization signal VSYNC to a clear terminal CL of a counter 15, whereas an AND gate 27 delivers an output signal to an enable terminal ENA of the counter 15. Consequently, the counter 15 is reset by the vertical synchronization signal VSYNC to start counting the frequency signal produced at the sync tip in a period in which the output from the AND gate 27 of FIG. 2, namely, each of the vertical and horizontal synchronization signals VSYNC and a is at its high level. In this embodiment, the counting operation is carried out only while the horizontal synchronization signal a is kept at its high level. The counting is achieved without being influenced by a variation in the frequency of the sync tip signal due to the level change of the synchronization signal a, for appropriately determining the recording modes.

Figure 7:
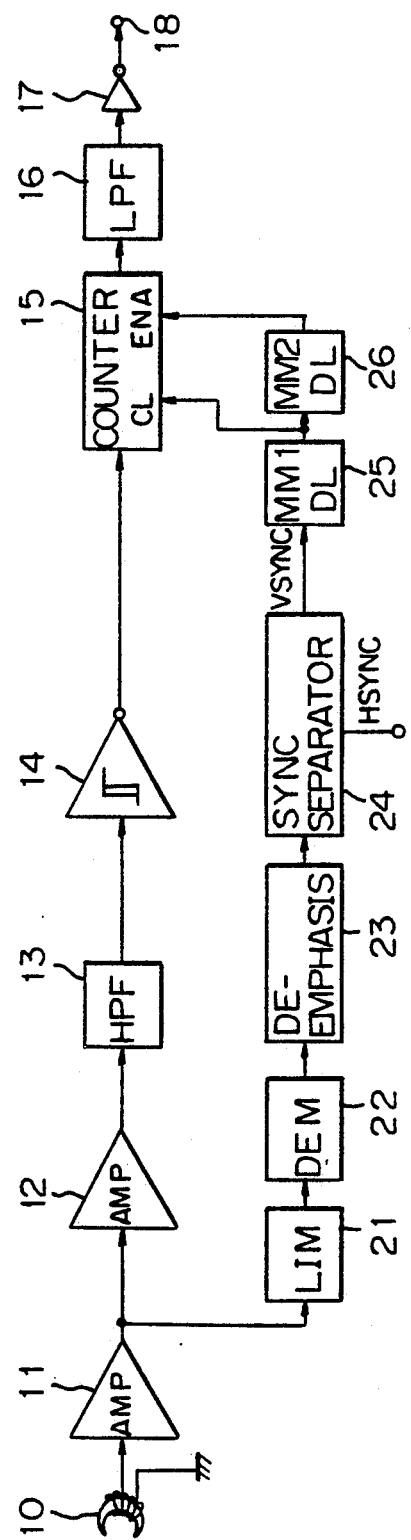
FIG. 7 is a block diagram schematically showing another alternative embodiment of a recording mode determining apparatus in accordance with the present invention.

FIG. 7 shows still an alternative embodiment of the recording mode determining apparatus in accordance with the present invention. In this apparatus, only a vertical synchronization signal VSYNC produced from a synchronization signal separator circuit 24 is supplied to a first monostable multivibrator, MM1, 25.

FIG. 8 shows signals produced from the apparatus of FIG. 7.

In this embodiment, a synchronization signal separator circuit 24 produces a vertical synchronization signal VSYNC delayed by substantially a 1H period with respect to a vertical synchronization pulse portion of a complex synchronization signal CSYNC. The vertical synchronization signal VSYNC is fed to a first monostable multivibrator, MM1, 25. The monostable multivibrator MM1, 25 produces an output signal which is set to a high level at a timing synchronized with a edge positive-going of the vertical synchronization signal VSYNC. The level H of the output signal is kept for a predetermined period of time T1 (16 μs in this embodiment). The output signal is supplied to a clear terminal CL of a counter 15 and to a second monostable multivibrator, MM2, 26.

The second monostable multivibrator, MM2, 26 produces an output signal which is set to its high level in time with a negative-going edge of the output from the first monostable multivibrator 25. The level H of the output signal is thereafter kept for a predetermined period of time T2 (3.5 μ s in this embodiment). The output signal is supplied to an enable terminal ENA of the counter 15, which hence operates for the period T2.

The period T2 in which the counter 15 operates is set to a point near substantially a center of a vertical synchronization pulse portion of the complex synchronization signal CSYNC and is preferably set to a position between the second and third demarcation pulse portions a, or between the third and fourth demarcation pulses a as shown in FIG. 2. The signal of the sync tip frequency component supplied to the counter 15 may be disturbed at an edge of the vertical synchronization pulse. However, the disturbance is considered to be reduced in the neighborhood of the center of the portion of vertical synchronization pulse. In addition, the period T2 is established substantially at a position of the center between two adjacent demarcation pulses a. This is because the measurement of the sync tip frequency is desired to be conducted in a portion of the signal with the disturbance minimized to the greatest possible extent.

In a case where the apparatus includes a synchronization signal separator circuit producing a vertical synchronization signal VNYSC rising almost without delay with respect to the vertical synchronization pulse portion of the complex vertical synchronization signal CSYNC as denoted by a dot-and-dash line in FIG. 2, a circuit producing a one-shot pulse having a period T12 longer by 1H than the period T1 would be adopted as the first monostable multivibrator 25.

The counter 15 is cleared by the signal produced from the first monostable multivibrator 25 to achieve the counting operation during a period in which the output form the second monostable multivibrator 26 is retained at the level H. The frequency signal generated by the sync tip from a Schmitt inverter 13 is divided into one sixteenth by the counter 15. As described above, since the sync tip frequency is different between the normal-band and high-band recording modes, even when the same demultiplication factor is utilized for the demultiplication, different frequencies are attained as a result thereof. Also in this embodiment, depending on the level of the output signal from the counter 15 at a point of time when the period T2 is elapsed, whether the normal-band recording or the high-band recording may be determined.

In the embodiments described above, the produced pulse wave is divided by the counter 15 to use the level of the output signal obtained therefrom at a termination of operation of the counter 15 for the discrimination between the normal-band and high-band recording modes. However, the present invention is not restricted by this determining scheme. Other methods may also be used. For example, the sync tip frequency signal may be counted for a predetermined period of time by a CPU, not shown, to discriminate the normal-band recording from the high-band recording based on the counted value.

Incidentally, in the embodiment discussed above, although the description has been given of the determination for the recording modes of the still video signal, the present invention is not limited to the still video signal. Namely, the present invention is also applicable for determining the recording modes of a movie video signal recorded on a video tape.

In accordance with the present invention, a period of time in which the vertical and horizontal synchronization signals are generated is used as the reference to set a predetermined period of time. The signal containing the sync tip frequency component of the frequency-modulated video signal is counted in the predetermined period. Based on the resultant count, the recording mode is judged. In consequence, the counting operation is achieved without being influenced from a change in the sync tip frequency due to level variations in the horizontal synchronization signal, which enables the recording mode to be correctly determined.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An apparatus for determining one of a plurality of recording modes of a frequency-modulated video signal which is recorded on a recording medium in one of said plurality of recording modes under frequency modulation, wherein the frequency modulation is different in frequency from each of said plurality of recording modes, comprising:
    reader means for reading out the frequency-modulated video signal from the recording medium;
    demodulator means for demodulating the frequency-modulated video signal read out from the recording medium;
    synchronization signal separator means for extracting pulse signals related to a vertical synchronization signal and a horizontal synchronization signal from the video signal demodulated by said demodulator means;
    period setting means for setting a first predetermined period on the basis of a period in which the pulse signals are generated;
    counter means for counting during said first predetermined period set by said period setting means a signal containing a sync tip frequency component of the frequency-modulated video signal read out by said reader means; and
    outputting means for outputting a mode signal representative of the one of said plurality of recording modes based on a resultant count in said counter means.

2. An apparatus in accordance with claim 1, wherein said period setting means sets said first predetermined period on the basis of a period in which the pulse signals related to both of the vertical and horizontal synchronization signals are generated.

3. An apparatus in accordance with claim 2, wherein said period setting means sets said first predetermined period when a second predetermined period is elapsed after both of the pulse signals related to the vertical and horizontal synchronization signals are generated.

4. An apparatus in accordance with claim 1, wherein said period setting means sets said first predetermined period at a position in the vicinity of a center of the vertical synchronization signal, said position being free from the pulse related to the horizontal synchronization signal.

5. An apparatus in accordance with the claim 1, wherein said video signal comprises a still video signal and said plurality of recording modes comprise a normal-band recording mode and a high-band recording mode.

6. An apparatus in accordance with claim 3, wherein said counter means comprises a counter, and said period setting means comprises an AND gate and two monostable multivibrators.

7. An apparatus in accordance with claim 4, wherein said counter means comprises a counter, and said period setting means comprises two monostable multivibrators.

8. A method for determining one of a plurality of recording modes of a frequency-modulated video signal which is recorded on a recording medium in one of said plurality of recording modes under frequency modulation, wherein the frequency modulation is different in frequency from each of said plurality of recording modes, the method comprising the steps of:
- (a) reading out the frequency-modulated video signal from the recording medium;
- (b) demodulating said frequency-modulated video signal read out from the recording medium at said step (a);
- (c) extracting pulse signals related to a vertical synchronization signal and a horizontal synchronization signal from the video signal demodulated at said step (b);
- (d) setting a first predetermined period on the basis of a period in which the pulse signals are generated;
- (e) counting during said first predetermined period set at said step (d) a signal containing a sync tip frequency component of said frequency-modulated video signal read out at said step (a); and
- (f) outputting a mode signal representative of the one of said plurality of recording modes based on a resultant count from said step (e).

9. The method in accordance with claim 8, wherein said step (d) sets said first predetermined period on the basis of a period in which the pulse signals related to both of said vertical and horizontal signals are generated.

10. The method in accordance with claim 9, wherein said step (d) sets said first predetermined period when a second predetermined period is elapsed after both of the pulse signals related to said vertical and horizontal signals are generated.

11. The method in accordance with claim 8, wherein said step (d) sets said first predetermined period at a position in the vicinity of a center of said vertical synchronization signal, said position being free from the pulse related to said horizontal synchronization signal.

12. The method according to claim 8, wherein said plurality of recording modes comprise a normal-band recording mode and a high-band recording mode.

* * * * *